Patented Aug. 22, 1933

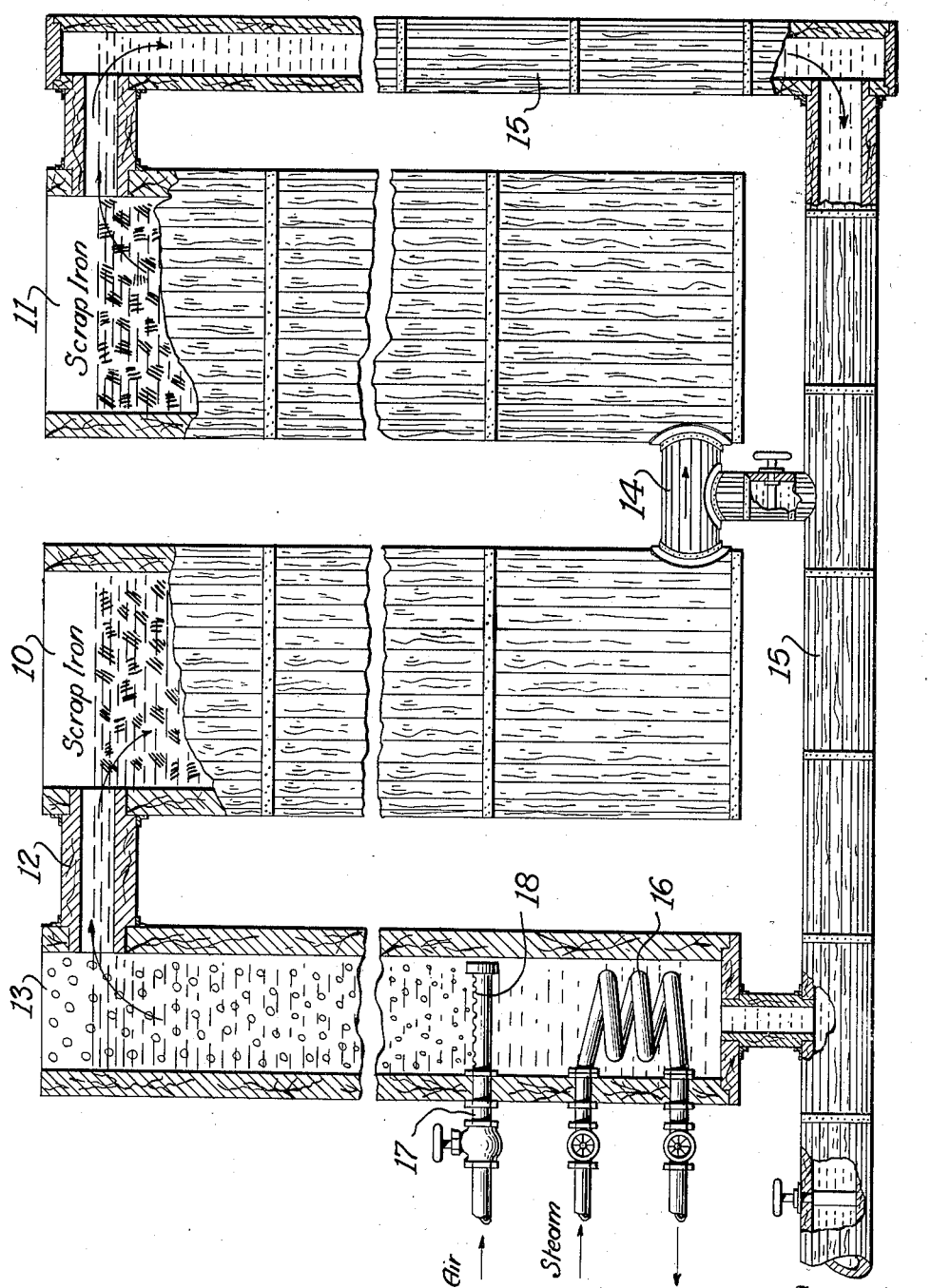

1,923,362

UNITED STATES PATENT OFFICE 1,923,362

PRODUCTION OF IRON OXIDE PIGMENTS

Verne Frazee, Easton, Pa.

Application November 25, 1927
Serial No. 235,562

5 Claims. (Cl. 134—59)

This invention relates to the manufacture of iron oxide pigments, and its chief object is to provide a simple, economical, and easily controlled process by which clear yellow pigments can be obtained, capable of being extended by calcination through virtually the entire range of reds now employed in the arts. To this and other ends the invention comprises the novel features hereinafter described.

The accompanying drawing illustrates diagrammatically, in vertical section, an apparatus suitable for use in carrying out my invention in the preferred manner.

In its preferred practice the process comprises two stages. In the first a product is formed which is without value as a pigment. In the second stage a product is formed and combined with the first product in such way that the final product is a useful pigment of high quality, yellow in color but capable of being changed to red, if desired, by the usual calcination. Much of the first product consists of hydrated ferric oxide and calcium sulfate as well as basic ferric sulfate. In the subsequent steps of the process the calcium sulfate becomes readily soluble, basic ferric sulfate is resolved by hydrolysis into hydrated ferric oxide, and in the final washing of the product a pigment consisting of commercially pure hydrated ferric oxide may be obtained.

In practicing the invention in the preferred way I prepare a relatively concentrated solution of ferrous sulfate in water, say a 17 or 18 per cent solution, as for example about 2700 to 2800 pounds in 1800 to 2000 gallons, and add to it about 600 pounds of hydrate of lime, preferably prepared as milk of lime, bringing the whole up to approximately 2300 gallons. The ferrous sulfate solution and the milk of lime are used cold or at room or climatic temperature (say 70° to 85° F.) though it may be somewhat higher or lower. In no case, however, should the admixture be made with the sulfate solution hot. When the lime is added a heavy blue-green compound is formed at once.

Air is now blown through the cold mass (70° to 85° F.) from the bottom thereof at the rate of 150 to 250 cubic feet per minute. The oxygen thus introduced oxidizes the blue-green compound, at first forming a dark, dirty greenish color, gradually acquiring a yellowish tinge, and in 24 to 48 hours becoming a deep yellow, indicating the end of the reaction, at which point all the iron in the solids is in the ferric state, chiefly in the form of hydrated ferric oxide. The time required for this operation depends upon various factors, such as the concentration of the mass, and the rate of blowing.

Throughout the blowing and at the end there are only traces of ferric sulfate to be found in the mother liquor, and by the time the color of the precipitate becomes well tinged with yellow, and from then on to the end of the reaction, practically no ferrous iron is found in the solids. A sample taken when the reaction was about half completed (the product then being well tinged with yellow) contained 22.51 per cent of calcium compound calculated as CaO, 30.61 per cent SO₃, and 24.07 per cent iron, calculated as metal, or 40,23 per cent calculated as basic ferric oxide. The filtrate showed 9.65 per cent of ferrous sulfate. At the end of the reaction a sample showed 20.60 per cent CaO, 29.29 per cent SO₃, and 41,67 per cent basic ferric oxide.

The mass is now thinned by the addition of about 1000 gallons of water and the whole is agitated and gently warmed to 100° or 110° F. for about two hours. The agitation may be conveniently effected by blowing with air at room temperature at any rate sufficient to agitate the mass without forming appreciable amounts of ferric sulfate. A sample taken at the end of this period contained 18.85 per cent CaO, 27.96 per cent SO₃, and 42.46 per cent basic ferric oxide. The filtrate showed 6.42 per cent ferrous sulfate. The product thus obtained is capable, through its color characteristics, of modifying the darker shades precipitated in the succeeding stage or stages of the process, in such a manner that the effect is similar to that of a light shade blending with a dark shade to produce an intermediate shade. However, the first stage product is unstable in color when separated from the mother liquor and is useless as a pigment. If filtered, washed with water, and dried at temperatures below 212° F. or thereabouts either in open air or with air excluded, and the product mixed with linseed oil, the resultant color is a dirty brownish yellow.

The reactions taking place during the above, whatever they may be, appear to be rather narrowly limited by concentration and temperature, and it is therefore advisable not to depart much from the proportions and conditions stated.

The mass is now transferred to the apparatus shown in the drawing and water is added to bring the total volume up to about 10,000 gallons, to afford ample water for hydrolysis, and if necessary ferrous sulfate is added to make the supernatant liquor contain from 0.1 to 0.5 pound per gallon, or about 1.2 to 6 per cent. Satisfactory results have been obtained with a concentration of 2.4 to 3.6 per cent. The apparatus illustrated comprises two upright tanks 10, 11, containing metallic iron, which may be in the form of scrap, piled loosely in the tanks. Tank 10 is connected at the top by a pipe 12 to an upright tank 13 and at the bottom by a pipe 14 to tank 11. A pipe 15 connects the bottom of tank 13 to the upper part of tank 11. In tank 13 is a steam heating coil 16 and an air pipe 17 having ports 18 for discharge of air under suitable pressure.

By means of the steam coils 16 the mass is heated to about 140° F., and air is blown into the mass in tank 13 from the air pipe 17, inducing a circulation upward in tank 13, downwardly through tank 10, upwardly through tank 11, and thence through the transfer pipe 15 to the bottom of the first tank, 13. Preferably the capacity of tanks 10 and 11 together is not less than about eight times that of tank 13, that is, the oxidizing zone; and with these relative capacities the flow through pipe 15 is preferably about 1000 gallons per minute. Assuming that the head of liquid above the air pipe 17 is 18 feet, and the pipe has six orifices each about .5 inch in diameter, a discharge of 350 cubic feet of air therethrough per minute will product the desired rate of circulation and will afford the desired rate of oxidation.

In tank 13 the ferrous sulfate in solution is oxidized to basic ferric sulfate, which in the presence of so much water hydrolyzes, forming hydrated ferric oxide, $Fe_2O_3.2Fe(OH)_3$, and sulfuric acid, $H_2SO_4$. Accurate control of this reaction is very desirable since otherwise considerable quantities of ferric sulfate ($Fe_23SO_4$) may form and contaminate the product. The excess air escapes from tank 13 into the atmosphere. From the latter tank the liquor flows down through tank 10 where sulfuric acid is neutralized by the iron, forming ferrous sulfate (later oxidized in tank 13) with liberation of nascent hydrogen in sufficient amount to create a reducing atmosphere in tank 10 and prevent any oxidation of iron or liquor in this tank should any oxygen be mechanically carried over from tank 13, thus preventing such oxygen from oxidizing anything in tank 10. Neutralization of sulfuric acid with formation of ferrous sulfate and hydrogen continues in tank 11, and the hydrogen liberated, together with any mechanically carried over from tank 10, escapes readily from the liquor flowing up in tank 11 so that but little if any is carried on to tank 13. This is an important feature of the process, as I have found that free or nascent hydrogen in the oxidization zone militates against the formation of basic ferric sulfate and that if it is present in substantial amount the oxidation reaction practically ceases, the process thus becoming ineffective, although a limited amount of nascent hydrogen in the oxidizing zone appears to have a beneficial effect on the product.

As the second stage reactions proceed the product produced thereby, and the product of the first stage, together make the final product. The longer the second stage operation is continued the darker the final product becomes, and accordingly the second stage reactions are continued until the desired final color is obtained and becomes stable, which may require as long as three or four days, or even longer. The mass can then be filtered and the solids washed with water at ordinary temperature to remove soluble compounds (including calcium sulfate) without the product becoming dirty in color, as would happen if the second stage reactions are not continued long enough. When dried the iron product thus recovered forms a desirable pigment, and appears to have the composition $Fe_2O_3.2Fe(OH)_3$. In some cases the product may contain a small amount of basic ferric sulfate, which may be eliminated, if desired, in any convenient and suitable manner, as for example by letting the mass stand after blowing has been stopped, to permit all the basic sulfate to hydrolyze, before filtering.

By arresting the process at the proper times the entire range of yellow ferric oxide pigments commonly used in the arts can be obtained, and these can be calcined to give the corresponding range of red oxide pigments. Any suitable method of calcination can be employed, remembering that each shade of yellow ferric oxide gives a different series of reds.

It is to be understood that the invention is not limited to the specific details herein set forth, since these can be varied without departure from the spirit of the invention as defined by the appended claims.

I claim—

1. In a process of producing yellow iron oxide pigments, the steps comprising mixing ferrous sulfate solution and lime, passing oxygen through the mixture at about room temperature and suitable concentration and producing thereby a yellow hydrated oxide of iron, passing oxygen through the mass at a temperature of about 140° F. and at suitable concentration whereby basic ferric sulfate is produced and hydrolyzed in the presence of the first hydrated oxide to hydrated ferric oxide and free sulfuric acid, transferring the mass to a reducing zone containing metallic iron to neutralize sulfuric acid with production of ferrous sulfate, and repeating the last two steps until a stable product of the desired color is obtained.

2. In a process of producing yellow iron oxide pigments, the steps comprising mixing lime with a relatively concentrated ferrous sulfate solution, passing air through the mixture at about room temperature and producing thereby a yellow hydrated ferric compound of iron of unstable color, increasing the volume of the mass by addition of water, passing air through the mass at about 140° F. and producing thereby a hydrated ferric oxide and free sulfuric acid, transferring the mass to a reducing zone containing metallic iron to neutralize sulfuric acid with production of ferrous sulfate and liberation of hydrogen, removing hydrogen from the mass, and repeating the last three steps continuously until a stable product of the desired color is obtained.

3. In a process of making yellow iron pigments, the steps comprising continuously blowing air into an aqueous solution of ferrous sulfate containing hydrated ferric oxide in suspension to oxidize ferrous sulfate to basic ferric sulfate and by hydrolysis precipitate more of said hydrated oxide with concurrent production of sulfuric acid, continuously withdrawing the mass from the zone of oxidation and passing it over metallic iron in the presence of nascent hydrogen to neutralize the sulfuric acid, produce ferrous sulfate in solution, and restrict oxidation of the iron and ferrous sulfate by atmospheric oxygen, and continuously returning the mass to the oxidizing zone.

4. In a process of making yellow iron pigments, the steps comprising continuously oxidizing ferrous sulfate in aqueous solution containing hydrated ferric oxide in suspension to produce basic ferric sulfate and by hydrolysis precipitate more of said hydrated ferric oxide with concurrent production of sulfuric acid, continuously withdrawing the mass from the zone of oxidation and passing it over metallic iron in the presence of nascent hydrogen to neutralize the sulfuric acid and produce ferrous sulfate in solution with liberation of hydrogen for restricting oxidation of the iron and ferrous sulfate by atmospheric oxygen, continuously removing free hydrogen from the mass, and continuously returning the mass to the oxidizing zone.

5. In a process of making yellow iron pigments, the steps comprising continuously blowing air into an upright vessel containing ferrous sulfate in solution to oxidize ferrous sulfate to basic ferric sulfate and by hydrolysis precipitate basic ferric hydrate, continuously withdrawing the mass from the top of said vessel and passing it downwardly through a vessel containing metallic iron to neutralize thereby sulfuric acid resulting from the hydrolysis and produce more ferrous sulfate, continuously passing the mass from the bottom of the second vessel upwardly through an open vessel containing metallic iron to neutralize any sulfuric acid carried over from the second vessel and for escape of free hydrogen resulting from the neutralization of sulfuric acid in either vessel, and continuously returning the mass from the top of the third vessel to the bottom of the first for oxidation of ferrous sulfate.

VERNE FRAZEE.